United States Patent [19]

Wada et al.

[11] Patent Number: 5,465,849
[45] Date of Patent: Nov. 14, 1995

[54] COLUMN AND METHOD FOR SEPARATING PARTICLES IN ACCORDANCE WITH THEIR MAGNETIC SUSCEPTIBILITY

[75] Inventors: Yukio Wada, Mito; Kazunori Yamamoto, Naka; Osami Tsukamoto, Mitaka; Takeshi Ohara, Tsukuba; Chie Miyake, Toyonaka; Sadao Mori, Nagoya, all of Japan

[73] Assignee: Doryokuro Kakunenryo Kaihatsu Jigyodan, Tokyo, Japan

[21] Appl. No.: 304,179

[22] Filed: Sep. 12, 1994

[30] Foreign Application Priority Data

Feb. 24, 1994 [JP] Japan .................................. 6-051305

[51] Int. Cl.⁶ ...................................................... B03C 1/00
[52] U.S. Cl. ........................ 209/214; 209/223.1; 209/225; 209/232; 210/222
[58] Field of Search .............................. 209/39, 213, 214, 209/223.1, 228, 231, 232, 225, 226, 227; 210/222

[56] References Cited

U.S. PATENT DOCUMENTS

| | | | |
|---|---|---|---|
| 2,976,995 | 3/1961 | Forrer | 209/232 X |
| 4,102,780 | 7/1978 | Sun et al. | 209/213 X |
| 4,663,029 | 5/1987 | Kelland et al. | 209/214 |
| 5,039,426 | 8/1991 | Giddings | 209/210 X |
| 5,169,006 | 12/1992 | Stelzer | 209/232 X |

FOREIGN PATENT DOCUMENTS 2134819  8/1984  United Kingdom ............... 209/232

*Primary Examiner*—William E. Terrell
*Assistant Examiner*—Tuan Nguyen
*Attorney, Agent, or Firm*—Oliff & Berridge

[57] ABSTRACT

Particles contained in a suspension are separated in accordance with their magnetic susceptibility and based on the variation in flow velocity of suspension. In order to achieve this magnetic separation, a pair of wall plates having at least one flat surface in which a plurality of ferromagnetic narrow wires are buried in parallel are positioned in parallel to each other with a small distance therebetween so that the flat surfaces are opposed to each other to form a channel. The suspension flows in a laminar state with different flow velocities through the channel in the longitudinal direction of the ferromagnetic wires. A magnetic field is externally applied to the channel in the direction perpendicular both to the flow direction and the wall plates. Particles are separated in accordance with their magnetic susceptibility and based on variation in flow velocity which interacts with the magnetic susceptibility.

8 Claims, 2 Drawing Sheets

COLUMN AND METHOD FOR SEPARATING PARTICLES IN ACCORDANCE WITH THEIR MAGNETIC SUSCEPTIBILITY

BACKGROUND OF THE INVENTION

1. Field of the Invention

This invention generally relates to a group-separation device and method for particles based on their magnetic susceptibilities, and more particularly to a column and method for group-separating particles contained in a suspension in accordance with their magnetic susceptibility by using a magnetic chromatography technique with a high gradient magnetic field. This technique is useful in various modern industries for, for example, separation of harmful materials or concentration of materials.

2. Description of Related Art

One of the conventional method for separating particles in a suspension is High Gradient Magnetic Separation (HGMS). This type of magnetic separation utilizes a magnetic force as a pure physical force without a chemical reaction, and therefore has following advantages;

(i) It enables a high speed separation of A large quantity of suspension without using chemicals, and (ii) It allows the separation system to be repeatedly used without delivering secondary waste since the magnetic force is eliminated simply by cutting off the magnetic field.

Because of the above characteristics, this technique attracts a great deal of attention as a practical technique for the separation of harmful materials or a concentration of materials.

A more advanced HGMS technique which has been studied recently is to provide a magnetic filter comprising ferromagnetic narrow wires in a strong magnetic field generated by a super conductive electro-magnet, and to make a suspension flow through the filter and separate a group of particles by adsorbing them onto the filter material.

Thus, this type of magnetic separation is a solid separating method by adsorbing particles contained in the suspension onto the magnetic filter. A drawback of this method is that it is difficult to adsorb particles having a very small diameter due to competition between the magnetic force and the flowing force. The marginal diameter of adsorbed particles depends on the magnetic susceptibility and the diameter of the particles, and is approximately $10^{-7}$ m for a paramagnetic particles and $10^{-8}$ m for a ferromagnetic particles.

SUMMARY OF THE INVENTION

Accordingly, it is an objective of the invention to provide a novel technique of magnetic separation of particles contained in the suspension, which improves a marginal diameter of separated particles to enable a separation of finer particles.

In order to achieve the above objective, the technique of the present invention has been conceived by combining High Gradient Magnetic Separation (HGMS) and Field Flow Fractionation (FFF). Rather than using magnetic adsorption, this technique utilizes a high gradient magnetic field to generate a density distribution of particles, and a variation in flowing velocity which interacts with the magnetic susceptibilities.

In one aspect of the invention, a magnetic separation method using magnetic chromatography is provided. A pair of wall plates, having at least one flat surface in which a plurality of ferromagnetic narrow wires are buried in parallel, are positioned parallel to each other with a small distance therebetween so that the flat surfaces are opposed to each other, and thus a channel is formed between the wall plates. A suspension containing particles to be separated is allowed to flow through the channel. Since the inner surface of the channel is flat and smooth, the suspension flows through the channel in a laminar state with different flow velocities along the longitudinal direction of the ferromagnetic wires. Then, an outer magnetic field is applied in the direction perpendicular both to the flow direction and the wall plates. Finally, the particles in the suspension are separated in accordance with their magnetic susceptibilities and based on the variation in the flow velocity.

When a strong magnetic field is externally applied to the wall plates including ferromagnetic wires, lines of magnetic force concentrate to the ferromagnetic wires, and cause a high gradient magnetic field in the channel, in the vicinity of the wires. The particles having higher magnetic susceptibility are drawn by the magnetic force nearer to the channel surfaces, and therefore, the density of the suspension becomes higher in that portion. On the other hand, the density of the particles having a low magnetic susceptibility does not change so significantly. Meanwhile, the suspension flows in a laminar state, and the particles having a low magnetic susceptibility which exist at the center of the channel flow out from the channel faster than the particle having high magnetic susceptibility which exist near the inner surfaces of the channel. Thus, particles contained in the suspension are separated according to their magnetic susceptibilities. The feature of this invention is that the particles are not adsorbed onto the inner wall of the channel, but always move through the channel as the suspension flows.

In another aspect of the invention, a column for separating particles having different magnetic susceptibility in the suspension is provided. This column comprises (a) a pair of wall plates having at least one flat and plane surface and with a plurality of ferromagnetic narrow wires being buried therein, said wall plates being arranged in parallel to each other with a predetermined distance apart so that the plane surfaces are opposed to each other, (b) a channel formed between said pair of wall plates, and (c) means for applying a magnetic field to the wall plates in the direction perpendicular both to the wall plates and the length of the ferromagnetic wires.

Because of the flat and plane inner surfaces, the suspension containing particles to be separated flow in a laminar state with different velocities along the longitudinal direction of the ferromagnetic wires. When the magnetic field is applied to the channel, the particles having higher magnetic susceptibility are drawn nearer to the wall plate. The different magnetic susceptibility of the particles results in the different moving speed, corresponding to the location of the particles in the suspension, which enables an effective separation of particles in the suspension. Thus, the particles are effectively separated in accordance with their magnetic susceptibilities.

Other objects and advantages of the invention will become apparent to those skilled in the art from the following detailed description in connection with the accompanying drawings in which.

DETAILED DESCRIPTION OF THE PREFERRED EMBODIMENT

Figure 1:
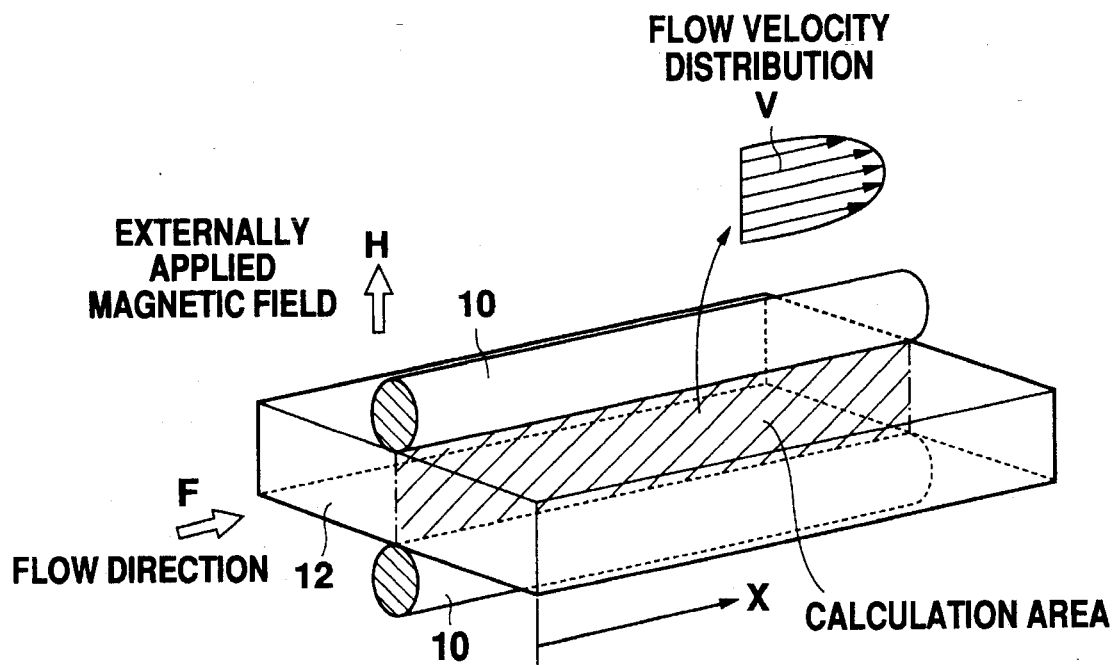
FIG. 1 is a schematic diagram showing a principle of the magnetic separation of this invention.
Figure 2:
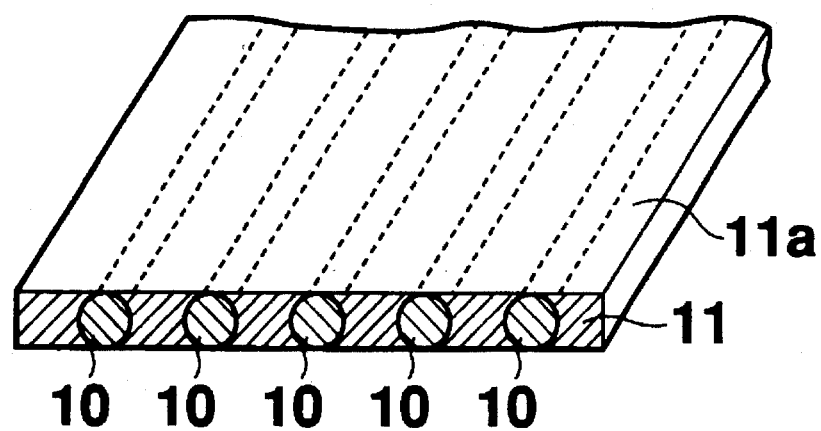
FIG. 2 is a schematic diagram showing a structure of the wall plate 11.

With reference now to FIGS. 1 and 2, there is shown a basic principle of a group separation operation of the present invention using a magnetic chromatography. A pair of plane wall plates 11, in which a plurality of ferromagnetic narrow wires are buried in parallel, are positioned parallel to each other with a narrow space therebetween to form a channel 12. Accordingly, the upper and lower rows of ferromagnetic wires are opposed to each other across the channel 12.

A suspension flows through the channel along the longitudinal direction of the ferromagnetic wires. Since the inner surfaces of the wall plates are flat, the suspension flows in a laminar state with different flow velocities. That is, as shown in FIG. 1, the nearer to the channel surface, the smaller the flow velocity V. The flow velocity is relatively fast at the center of the channel. When an outer magnetic field is applied in the direction H perpendicular both to the flow direction F and the wall plates, lines of magnetic force concentrate to the ferromagnetic wires 10, and therefore a high gradient magnetic field is generated in the vicinity of the ferromagnetic wires 10.

Figure 3:
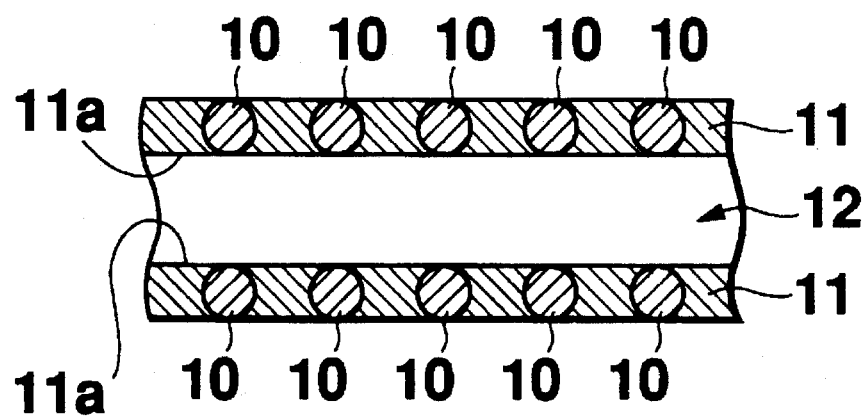
FIG. 3 is a cross-sectional view of the column which shows a pair of wall plates 11 and a channel 12.

In one embodiment, as shown in FIG. 2, a plurality of ferromagnetic narrow wires 10 are buried in parallel in each of the wall plates 11. At least one surface 11a of the wall plate 11 is flat and smooth, and a pair of the wall plates are positioned so that the flat surfaces 11a are opposed to each other (see FIG. 3). The flat surfaces 11a becomes inner surfaces of the channel 12.

The diameter of the ferromagnetic wire is in the range between 10 μm to several hundreds of μm, and preferably 10–200 μm. When the suspension is, for example, a reprocessing liquid for nuclear fuel, the ferromagnetic wires are preferably made of Gadolinium (Gd) in which a neutron adsorption cross section is large. The distance between the wall plates (i.e channel width) is set to 100–600 μm.

Because of the magnetic force caused in the channel by the high gradient magnetic field, particles having a high magnetic susceptibility are drawn nearer to the channel inner surfaces. This means that the density of the particles having high magnetic susceptibility becomes higher in the vicinity of the channel surfaces. On the contrary, the density of particles having low magnetic susceptibility does not significantly change in the suspension. Meanwhile, due to the flow velocity distribution (i.e. faster at the center of the channel and slower in the vicinity of the channel surface), particles having small magnetic susceptibility are discharged from the channel faster than those having large magnetic susceptibility. Consequently, particles contained in the suspension are group-separated in accordance with their magnetic susceptibilities.

Figure 4:
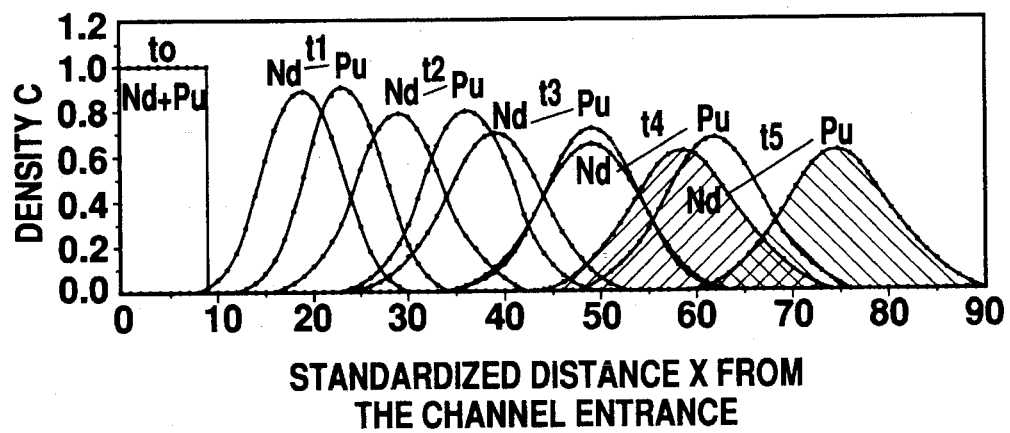
FIG. 4 is a chart in which the density vs. normalization distance from the channel entrance (which stands for elapsed time) is shown.

The simulation result will now be described. The calculation area is shown by hatched lines in FIG. 1. FIG. 4 illustrates the variation in density distribution of two kinds of particles in relation with time, at the calculation area. More particularly, this calculation result is obtained by filling the channel with a mixed suspension containing two kinds of particles, then letting the suspension slowly run down in the direction F, and calculating the positional change of the density distribution along the flowing direction. In this embodiment, free Neodymium (Nd) and free Plutonium (Pu) are selected as the two kinds of particles, and the channel width (i.e. distance between the upper and lower wall plates) is set small enough to assume that the diffusion of the particles is only in the vertical direction.

Parameters and obtained value from this calculation are as follows:

| Particles in the Suspension | |
|---|---|
| Diameter | 100 [Å] |
| Magnetic Susceptibility of the Particle 1 (Nd) | 3.51E-3 |
| Magnetic Susceptibility of the Particle 2 (Pu) | 6.23E-4 |
| Ferromagnetic Narrow Wire | |
| Diameter | 200 [μm] |
| Magnetization | 1.0/$\mu_0$ [A/m] |
| Outer Magnetic Field | 7.0/$\mu_0$ [A/m] |
| Channel Width | 500 [μm] |

As is apparent from FIG. 4, initially, Nd and Pu are uniformly mixed in the suspension at the time $t_0$. As the suspension flows through the channel (i.e. as time passes), Nd and Pu are gradually separated. Finally at $t_5$, these two particles are substantially separated. With the conventional HGMS under the same condition (200 μm diameter of ferromagnetic wire and 7.0/$\mu_0$ [A/m] of outer magnetic field), the marginal diameter of separated Nd was 700 Å. Thus, the subject invention realizes much improved group-separation of particles.

Although FIG. 1 shows only one unit of separation elements, in reality, a plurality of ferromagnetic wires 10 are densely arranged in parallel in each of the plane wall plates, and the channel 12 is formed between upper and lower rows of the ferromagnetic wires. The strong magnetic field is applied from outside to the channel by a known technique such as a super conductive magnet.

This group-separation using magnetic chromatography is applicable to nuclear fuel reprocessing. In that case, the particles contained in the reprocessing liquid are selected among several groups, such as (1) FP (Fission Product) elements other than rare earth elements, (2) U, Pu, Ce, Sm, TRU (Am, Np), (3) Pr, Nd, (4) Eu, Gd, Tb, Dy, TRU (Cm), in accordance with their susceptibilities. The present invention is also applicable to other fields, such as segregation of minerals, treatment of processing liquid, refinement of raw materials for the chemical industry or intermediary product, or group-separation of industrial waste.

The magnetic separation according to the invention realizes faster separation of a large quantity of dilute suspension, while keeping the advantages of the conventional HGMS such as reusability of the system without discharging secondary waste. Furthermore, rather than adsorbing particles to the filter, the principle of this invention is to generate a density distribution of the particles by high gradient magnetic field, and is based on the variation in flow velocity, so finer particles are easily separated in accordance with their magnetic susceptibilities.

This detailed description is set forth only for purposes of illustrating examples of the present invention and should not be considered to limit the scope thereof. Numerous other substitutions and modifications can be made to the invention without departing from the scope of the invention.

What is claimed is:

1. A column for separating particles contained in a suspension and having different magnetic susceptibilities, comprising:

(a) a pair of wall plates having at least one flat and plane surface in which a plurality of ferromagnetic narrow wires are buried in parallel, said wall plates being positioned in parallel to each other, and with a predetermined distance therebetween, with said flat surfaces being opposed to each other;

(b) a channel formed between the pair of wall plates; and (c) means for applying a magnetic field to the wall plates in the direction perpendicular both to the wall plates and the length of the ferromagnetic wires, said suspension flowing through the channel along the longitudinal direction of the ferromagnetic wires in a laminar state with different flow velocities, and particles having higher magnetic susceptibility being drawn nearer to the flat surfaces of the wall plates, thereby separating particles in accordance with the magnet susceptibility interacting with the flow velocity.

2. A column according to claim 1, wherein a diameter of said ferromagnetic narrow wire is 10–200 μm.

3. A column according to claim 2, wherein the distance between the flat surfaces of the wall plates is 100–600 μm.

4. A column according to claim 3, wherein said ferromagnetic narrow wires are made of ferromagnetic material having large neutron adsorption cross section.

5. A column according to claim 4, wherein said ferromagnetic material is gadolinium (Gd).

6. A method for separating particles contained in a suspension and having different magnetic susceptibilities, comprising steps of:

(a) positioning a pair of wall plates in parallel to each other with a predetermined distance therebetween, each of which has at least one flat and plane surface in which a plurality of ferromagnetic narrow wires are buried in parallel, so that the flat surfaces are opposed to each other to form a channel therebetween;

(b) applying a magnetic field to the wall plates in the direction perpendicular both to the wall plates and the length of the ferromagnetic wires; and (c) letting the suspension flow in a laminar state with different flow velocities through the channel in the longitudinal direction of the ferromagnetic wires, particles having higher magnetic susceptibility being drawn nearer to the channel surfaces;

(d) separating the particles in accordance with their magnetic susceptibilities and based on the variation in flow velocity which interacts with the magnetic susceptibility.

7. A method according to claim 6, wherein particles contained in the suspension and to be separated are selected among the groups of (1)Fission Product elements other than rare earth elements (2) Uranium, Plutonium, Cerium, Samarium, Americium, Neptunium, (3) Praseodymium, Neodymium and (4) Europium, Gadolinium, Terbium, Dysprosium, Curium.

8. A method according to claim 6, wherein the particles to be separated are Plutonium and Neodymium.

* * * * *